(12) United States Patent
Girina et al.

(10) Patent No.: US 11,035,020 B2
(45) Date of Patent: Jun. 15, 2021

(54) GALVANNEALED STEEL SHEET

(71) Applicant: ArcelorMittal, Luxembourg (LU)

(72) Inventors: Olga A. Girina, East Chicago, IN (US); Damon Panahi, East Chicago, IN (US)

(73) Assignee: ARCELORMITTAL, Luxembourg (LU)

( * ) Notice: Subject to any disclaimer, the term of this patent is extended or adjusted under 35 U.S.C. 154(b) by 286 days.

(21) Appl. No.: 16/067,055

(22) PCT Filed: Dec. 29, 2015

(86) PCT No.: PCT/IB2015/060026
§ 371 (c)(1),
(2) Date: Jun. 28, 2018

(87) PCT Pub. No.: WO2017/115107
PCT Pub. Date: Jul. 6, 2017

(65) Prior Publication Data
US 2019/0010574 A1    Jan. 10, 2019

(51) Int. Cl.
*B32B 15/01* (2006.01)
*C23C 2/06* (2006.01)
(Continued)

(52) U.S. Cl.
CPC .............. *C21D 9/46* (2013.01); *B32B 15/01* (2013.01); *B32B 15/013* (2013.01); *B32B 15/04* (2013.01); *B32B 15/043* (2013.01); *B32B 15/18* (2013.01); *C21D 1/22* (2013.01); *C21D 6/002* (2013.01); *C21D 6/005* (2013.01); *C21D 6/008* (2013.01); *C21D 8/0205* (2013.01); *C21D 8/0236* (2013.01); *C21D 8/0247* (2013.01); *C21D 8/0278* (2013.01); *C22C 38/00* (2013.01); *C22C 38/02* (2013.01); *C22C 38/04* (2013.01); *C22C 38/06* (2013.01); *C22C 38/12* (2013.01); *C22C 38/18* (2013.01); *C22C 38/22* (2013.01); *C22C 38/34* (2013.01); *C22C 38/38* (2013.01); *C22C 38/44* (2013.01); *C23C 2/02* (2013.01); *C23C 2/06* (2013.01); *C23C 2/26* (2013.01); *C23C 2/28* (2013.01); *C23C 2/285* (2013.01); *C23C 2/34* (2013.01); *C23C 2/40* (2013.01); *C23C 30/00* (2013.01); *C23C 30/005* (2013.01); *B32B 2307/54* (2013.01); *B32B 2311/30* (2013.01); *C21D 2211/001* (2013.01); *C21D 2211/002* (2013.01); *C21D 2211/008* (2013.01);
(Continued)

(58) Field of Classification Search
CPC ........ C22C 38/00; C22C 38/06; C22C 38/22; C22C 38/34; C22C 38/38; C22C 38/02; C22C 38/04; C22C 38/12; C22C 38/18; C22C 38/44; C23C 2/02; C23C 2/40; C23C 2/06; C23C 2/28; C23C 2/26; C23C 2/285; C23C 2/34; C23C 30/00; C23C 30/005; C21D 6/00; C21D 6/005; C21D 6/008; C21D 9/46; C21D 1/22; C21D 8/0278; C21D 8/0205; C21D 8/0236; C21D 8/0247; C21D 2211/001; C21D 2211/002; C21D 2211/008; C21D 6/002; Y10T 428/12792; Y10T 428/12799; Y10T 428/12958; Y10T 428/12965; Y10T 428/12972; Y10T 428/26; B32B 15/013; B32B 15/01; B32B 15/04; B32B 15/043; B32B 15/18; B32B 2311/30; B32B 2307/54
See application file for complete search history.

(56) References Cited

U.S. PATENT DOCUMENTS 5,895,534 A    4/1999    Daley et al.
6,368,728 B1   4/2002    Tobiyama et al.
(Continued)

FOREIGN PATENT DOCUMENTS

CN    101225499 A    7/2008
CN    102149840 A    8/2011
(Continued)

OTHER PUBLICATIONS

Guhui Gao et al: "Enhanced Ductility and Toughness in an Ultrahigh-Strength Mn—Si—Cr—C Steel: The Great Potential of Ultrafine Filmy Retained Austenite" Acta Materialia, vol. 76, Jun. 26, 2014, pp. 425-433.
(Continued)

*Primary Examiner* — Michael E. La Villa
(74) *Attorney, Agent, or Firm* — Davidson, Davidson & Kappel, LLC

(57) ABSTRACT

A method for producing a coated steel sheet having a tensile strength of at least 1450 MPa and a total elongation of at least 17% is provided. The method includes providing a cold rolled steel sheet having a chemical composition in weight %: 0.34%≤C≤0.45%, 1.50%≤Mn≤2.30%, 1.50%≤Si≤2.40%, 0%<Cr≤0.7%, 0%≤Mo≤0.3%, 0.10%≤Al≤0.7%, optionally 0%≤Nb≤0.05%, and a remainder of Fe and unavoidable impurities. The sheet is annealed at an annealing temperature higher than the Ac3 transformation point of the steel, quenched to a quenching temperature lower than the Ms transformation point of the steel and between 150° C. and 250° C., reheated to a partitioning temperature between 350° C. and 450° C., maintained at the partitioning temperature for at least 80 s, then coated by galvannealing, with an alloying temperature between 470° C. and 520° C. A steel sheet is also provided.

6 Claims, No Drawings

(51) Int. Cl.

| | | |
|---|---|---|
| *C23C 2/28* | (2006.01) | |
| *C23C 2/40* | (2006.01) | |
| *C22C 38/38* | (2006.01) | |
| *C22C 38/34* | (2006.01) | |
| *C22C 38/22* | (2006.01) | |
| *C22C 38/06* | (2006.01) | |
| *C21D 6/00* | (2006.01) | |
| *C21D 9/46* | (2006.01) | |
| *C21D 8/02* | (2006.01) | |
| *C21D 1/22* | (2006.01) | |
| *C22C 38/00* | (2006.01) | |
| *C23C 2/02* | (2006.01) | |
| *B32B 15/04* | (2006.01) | |
| *C22C 38/44* | (2006.01) | |
| *C23C 2/26* | (2006.01) | |
| *C22C 38/04* | (2006.01) | |
| *C23C 30/00* | (2006.01) | |
| *C22C 38/02* | (2006.01) | |
| *C22C 38/18* | (2006.01) | |
| *C22C 38/12* | (2006.01) | |
| *C23C 2/34* | (2006.01) | |
| *B32B 15/18* | (2006.01) | |

(52) U.S. Cl.
CPC .............. *Y10T 428/12792* (2015.01); *Y10T 428/12799* (2015.01); *Y10T 428/12958* (2015.01); *Y10T 428/12965* (2015.01); *Y10T 428/12972* (2015.01); *Y10T 428/26* (2015.01)

(56) References Cited

U.S. PATENT DOCUMENTS

| | | |
|---|---|---|
| 8,828,557 B2 | 9/2014 | Takagi et al. |
| 9,121,087 B2 | 9/2015 | Matsuda et al. |
| 9,200,343 B2 | 12/2015 | Matsuda et al. |
| 9,290,834 B2 | 3/2016 | Hasegawa et al. |
| 9,783,878 B2 | 10/2017 | Wakabayashi et al. |
| 2004/0074575 A1 | 4/2004 | Kashima et al. |
| 2006/0144482 A1 | 7/2006 | Moulin |
| 2011/0146852 A1 | 6/2011 | Matsuda et al. |
| 2011/0168301 A1 | 7/2011 | Song et al. |
| 2011/0186189 A1 | 8/2011 | Futamura |
| 2013/0133786 A1 | 5/2013 | Matsuda et al. |
| 2014/0234657 A1 | 8/2014 | Azuma et al. |
| 2014/0322559 A1 | 10/2014 | Becker et al. |
| 2015/0086808 A1 | 3/2015 | Kasuya et al. |
| 2015/0203947 A1 | 7/2015 | Hasegawa et al. |
| 2016/0160309 A1* | 6/2016 | Allain .................... C22C 38/42 148/504 |
| 2016/0312326 A1 | 10/2016 | Drillet et al. |

FOREIGN PATENT DOCUMENTS

| | | |
|---|---|---|
| CN | 102884209 A | 1/2013 |
| CN | 103103435 A | 5/2013 |
| CN | 103361547 A | 10/2013 |
| DE | 10161465 C1 | 2/2003 |
| EP | 2325346 A1 | 5/2011 |
| EP | 2546368 A1 | 1/2013 |
| EP | 2660345 A2 | 11/2013 |
| EP | 2762592 A1 | 8/2014 |
| EP | 2762600 A1 | 8/2014 |
| GB | 486584 A | 6/1938 |
| JP | S61157625 A | 7/1986 |
| JP | 2004308002 A | 11/2004 |
| JP | 2012031462 A | 2/2012 |
| RU | 2341566 C2 | 12/2008 |
| RU | 2491357 C1 | 8/2013 |
| RU | 2518852 C1 | 6/2014 |
| WO | 2004022794 A1 | 3/2004 |
| WO | 2010126161 A1 | 11/2010 |
| WO | WO2012156428 A1 | 11/2012 |
| WO | WO2013146148 A1 | 10/2013 |
| WO | 2014020640 A1 | 2/2014 |
| WO | WO 2015/011554 * | 1/2015 |
| WO | 2015087224 A1 | 6/2015 |

OTHER PUBLICATIONS

Guhui Gao et al: "A Carbine-Free Bainite/Martensite/Austenite Triplex Steel with Enhanced Mechanical Properties Treated by a Novel Quenching-Partitioning-Tempering Process", Materials Science and Engineering A, vol. 559, Jan. 1, 2013, pp. 165-169.

Kai Zhang et al: "Microstructure and Mechanical Properties of a Nb-Microalloyed Medium Carbon Steel Treated by Quenching-Partitioning Process", Key Engineering Materials, vol. 531-532, Dec. 1, 2012, pp. 596-599.

Kohichi Sugimoto et al: "Hot Forging of Ultra High-Strength TRIP-Aided Steel", Materials Science Forum, vol. 638-642, Jan. 1, 2010, pp. 3074-3079.

John G Speer et al: "Analysis of Microstructure Evolution in Quenching and Partitioning Automotive Sheet Steel", Metallugical and Materials Transactions A, Springer-Verlag, New York, vol. 42, Sep. 15, 2011, pp. 3591-3601.

* cited by examiner

GALVANNEALED STEEL SHEET

The present invention concerns the manufacture of a high strength galvannealed steel sheet having an improved tensile strength and an improved total elongation, and a galvannealed steel sheet obtained by this method.

BACKGROUND

To manufacture various equipment such as parts of body structural members and body panels for automotive vehicles, it is now usual to use sheets made of DP (dual phase) steels multi-phase, complex phase or martensitic steels.

For example, a high strength multi-phase may include a bainite-martensitic structure with/without some retained austenite and contains about 0.2% of C, about 2% of Mn, about 1.5% of Si which would result in a yield strength of about 750 MPa, a tensile strength of about 980 MPa, and a total elongation of about 10%. These sheets are produced on continuous annealing line by quenching from an annealing temperature higher than Ac3 transformation point, down to an overaging temperature above Ms Transformation point and maintaining the sheet at the temperature for a given time. Optionally, the sheet is galvanized or galvannealed.

BRIEF SUMMARY OF THE INVENTION

To reduce the weight of the automotive parts in order to improve their fuel efficiency in view of the global environmental conservation it is desirable to have sheets having improved strength-ductility balance. But such sheets must also have a good formability.

Besides, it is desirable to produce a galvannealed steel sheet, since galvannealing provides an improved weldability and a high-corrosion resistance after spot welding and stamping.

In this respect, it is desirable to provide a galvannealed steel sheet having a tensile strength TS of at least 1450 MPa and a total elongation TE of at least 17%. These properties are measured according to ISO standard ISO 6892-1, published in October 2009. It must be emphasized that, due to differences in the methods of measure, in particular due to differences in the size of the specimen used, the values of the total elongation according to the ISO standard are very different, in particular lower, than the values of the total elongation according to the JIS Z 2201-05 standard. Furthermore, it is desirable to produce the galvannealed sheets with a manufacturing method which is robust, i.e. such that variations in the method parameters do not lead to important variations of the mechanical properties obtained Therefore, an object of the present invention is to provide such a sheet and a robust method to produce it.

The present invention provides a method for producing a galvannealed steel sheet, the method comprising the successive steps of:

providing a cold rolled steel sheet made of a steel having a chemical composition comprising, in weight %:

0.34%≤C≤0.45%
1.50%≤Mn≤2.30%
1.50≤Si≤2.40%
0%<Cr≤0.7%
0%≤Mo≤0.3%
0.10%≤Al≤0.7%,
and optionally 0%≤Nb≤0.05%, the remainder being Fe and unavoidable impurities, annealing the cold-rolled steel sheet at an annealing temperature AT higher than the Ac3 transformation point of the steel, quenching the annealed steel sheet by cooling it down to a quenching temperature QT lower than the Ms transformation point of the steel and comprised between 150° C. and 250° C., reheating the quenched steel sheet to a partitioning temperature PT between 350° C. and 450° C. and maintaining the steel sheet at the partitioning temperature PT for a partitioning time Pt of at least 80 s, coating the steel sheet by hot dip coating in a zinc bath followed by galvannealing, with an alloying temperature GAT comprised between 470° C. and 520° C.

According to other advantageous aspects of the invention, the method further comprises one or more of the following features, considered alone or according to any technically possible combination:

during quenching, the annealed steel sheet is cooled down to the quenching temperature QT at a cooling rate enough to avoid ferrite formation upon cooling, in order to obtain a quenched steel sheet having a structure consisting of martensite and austenite, said cooling rate is higher than or equal to 20° C./s, the quenching temperature is between 200° C. and 230° C., the partitioning time Pt is comprised between 100 s and 300 s, the annealing temperature AT is comprised between 870° C. and 930° C., the alloying temperature GAT is comprised between 480° C. and 500° C., the steel sheet is maintained at the alloying temperature GAT for a time GAt comprised between 5 s and 15 s, the composition of the steel is such that Al≤0.30%, the composition of the steel is such that 0.15%≤Al, the composition of the steel is such that 0.03%≤Nb≤0.05%, said galvannealed steel sheet has a tensile strength TS of at least 1450 MPa and a total elongation TE of at least 17%.

The invention also provides a galvannealed steel sheet made of a steel having a chemical composition comprising, in weight %:

0.34%≤C≤0.45%
1.50%≤Mn≤2.30%
1.50≤Si≤2.40%
0%<Cr≤0.7%
0%≤Mo≤0.3%
0.10%≤Al≤0.7%,
and optionally 0%≤Nb≤0.05%, the remainder being Fe and unavoidable impurities, the structure of the steel consisting of between 50% and 70% of martensite, residual austenite, and bainite.

According to other advantageous aspects of the invention the galvannealed steel sheet comprises one or more of the following features, considered alone or according to any technically possible combination:

the composition of the steel is such that Al≤0.30%, the composition of the steel is such that 0.15%≤Al, the composition of the steel is such that 0.03%≤Nb≤0.05%, the retained austenite has a C content comprised between 0.9% and 1.2%, said galvannealed steel sheet presents a tensile strength TS of at least 1450 MPa and a total elongation TE of at least 17%.

DETAILED DESCRIPTION

The invention will now be described in details but without introducing limitations.

According to the invention, the sheet is obtained by heat treating a hot-rolled and preferably cold rolled steel sheet made of steel having a chemical composition comprising, in weight %:

0.34% to 0.45% of carbon to ensure a satisfactory strength and to improve the stability of the retained austenite, which is necessary to obtain a sufficient elongation. If the carbon content is above 0.45%, the hot rolled sheet is too hard to cold roll and the weldability is insufficient.

1.50% to 2.40% of silicon in order to stabilize the austenite, to provide a solid solution strengthening and to delay the formation of carbides during partitioning with appropriate procedures to prevent the formation of silicon oxides at the surface of the sheet which would be detrimental to the coatability. Preferably, the silicon content is higher than or equal to 1.80%. Preferably, the silicon content is lower than or equal to 2.20%.

1.50% to 2.30% of manganese. The minimum content is defined to have a sufficient hardenability in order to obtain a microstructure containing at least 50% of martensite, and a tensile strength at least 1450 MPa. The maximum is defined to avoid having segregation issues which are detrimental to the ductility.

0% to 0.3% of molybdenum and 0% to 0.7% of chromium to increase the hardenability and to stabilize the retained austenite, in order to strongly reduce austenite decomposition during partitioning. The absolute zero value is excluded due to residual amounts. In a preferred embodiment, the composition comprises from 0% to 0.5% of chromium. Preferably, the molybdenum content is comprised between 0.07% and 0.20%, and the chromium content is preferably comprised between 0.25% and 0.45%.

0.10% to 0.7% of aluminum. Aluminum is added to obtain a high level of elongation as well as a good strength-ductility balance, and to increase the robustness of the manufacturing method, in particular to increase the stability of the mechanical properties obtained when the quenching temperature and the partitioning time vary. The maximum aluminum content of 0.7% is defined to prevent an increase of the Ac3 transformation point to a temperature which would render the annealing more difficult. Preferably, the aluminum content is higher than or equal to 0.15%, and/or lower than or equal to 0.30%, which allows obtaining a total elongation TE of at least 17% and a uniform elongation UE of at least 16%. Preferably, aluminum is added at a late stage, after the deoxidation stage.

The remainder is iron and residual elements or unavoidable impurities resulting from the steelmaking. In this respect, Ni, Cu, V, Ti, B, S, P and N at least are considered as residual elements which are unavoidable impurities. Therefore, generally, their contents are less than 0.05% for Ni, 0.05 for Cu, 0.007% for V, 0.001% for B, 0.005% for S, 0.02% for P and 0.010% for N.

Addition of microalloy elements such as niobium from 0% to 0.05% and/or titanium from 0% to 0.1% can be utilized to obtain the desired microstructure and an optimal combination of product properties, in particular an increased tensile strength. For example, Nb is added in an amount comprised between 0.03% and 0.05%.

A hot rolled steel sheet can be produced in a known manner from this steel.

As an example, a sheet having the above composition is heated to a temperature between 1200° C. and 1280° C., preferably about 1250° C., hot-rolled with a finish rolling temperature preferably less than 850° C., then cooled and coiled at a temperature preferably comprised between 500° C. and 730° C. The sheet is then cold-rolled.

After rolling, the sheet is pickled or cleaned, then heat treated and galvannealed.

The heat treatment, which is preferably made on a continuous annealing and hot dip coating line, comprises the following successive steps:

annealing the cold rolled sheet at an annealing temperature AT equal or higher than the Ac3 transformation point of the steel, and preferably higher than Ac3+15° C., in order to obtain an annealed steel sheet having a structure completely austenitic, but less than 1000° C. in order not to coarsen too much the austenitic grains. Generally, a temperature higher than 870° C. is enough for the steel according to the invention and this temperature does not need to be higher than 930° C. Then the steel sheet is maintained at this temperature i.e. maintained between AT−5° C. and AT+10° C., for a time sufficient to homogenize the temperature in the steel. Preferably, this time is of more than 30 seconds but does not need to be more than 300 seconds. To be heated to the annealing temperature, the cold rolled steel sheet is, for example, first heated to a temperature of about 600° C. at a heating rate typically below 20° C./s, for example below 10° C./s, then heated again to a temperature of about 800° C. at a heating rate typically below 10° C./s, for example below 2° C./s, and eventually heated to the annealing temperature at a heating rate below 5° C./s, for example below 1.5° C./s. In this case, the sheet is maintained at the annealing temperature AT for an annealing time At between 40 and 150 seconds.

quenching of the annealed sheet by it cooling down to a quenching temperature QT lower than the Ms transformation point, and comprised between 150° C. and 250° C. The annealed sheet is cooled to the quenching temperature QT at a cooling rate enough to avoid the formation of ferrite formation upon cooling. Preferably, the cooling rate is comprised between 20° C./s and 50° C./s, for example higher than or equal to 25° C./s. The quenching temperature QT and the cooling rate during quenching are chosen so as to obtain a quenched sheet having a structure consisting of martensite and austenite. The martensite and the austenite contents in the quenched sheet are chosen so as to allow obtaining, after the heat-treatment and the galvannealing, a final structure consisting of 50% to 70% of martensite, retained austenite, and bainite. If the quenching temperature QT is lower than 150° C., the fraction of the partitioned martensite in the final structure is too high to stabilize a sufficient amount of retained austenite, so that the total elongation does not reach 17%. Moreover, if the quenching temperature QT is higher than 350° C., the fraction of partitioned martensite is too low to obtain the desired tensile strength. Preferably, the quenching temperature QT is comprised between 200° C. and 230° C.

reheating the quenched sheet up to a partitioning temperature PT comprised between 350° C. and 450° C. The heating rate is preferably of at least 30° C./s.

maintaining the sheet at the partitioning temperature PT for a partitioning time Pt of at least 80 s, for example comprised between 80 s and 300 s, preferably at least 100 s. During the partitioning step, the carbon is partitioned, i.e. diffuses from the martensite into the austenite which is thus enriched in carbon. The degree of partitioning increases with the duration of the holding step. Thus, the holding duration Pt is chosen sufficiently long to provide a partitioning as complete as possible. However, a too long duration can cause the austenite decomposition and too high partitioning of martensite and, hence, a reduction in mechanical properties. Thus, the partitioning time is limited so as to avoid as much as possible the formation of ferrite.

hot-dip coating the sheet in a zinc bath followed by galvannealing, at an alloying temperature GAT. The heating to the alloying temperature is made preferably at a heating rate of at least 20° C./s, preferably at least 30° C./s. Preferably, the alloying temperature GAT is comprised between 470° C. and 520° C. Still preferably, the alloying temperature is lower than or equal to 500° C. and/or higher than or equal to 480° C. The sheet is maintained at the alloying temperature GAT for a time GAt which is for example comprised between 5 s and 20 s, preferably between 5 s and 15 s, for example between 8 s and 12 s.

QT at a cooling rate of 25° C./s, reheated to a partitioning temperature PT at a reheating rate of 40° C./s and maintained at the partitioning temperature PT for a partitioning time Pt, then galvannealed at an alloying temperature GAT for a time GAt or 10 s, then cooled to room temperature at a cooling rate of 5° C./s.

The mechanical properties were measured in the transverse direction relative to the direction of rolling. As it is well known in the art, the ductility level is slightly better in the direction of rolling than in the transverse direction for such high strength steel. Measured properties are the yield strength YS, the tensile stress TS, the uniform elongation UE and the total elongation TE.

The conditions of treatment and the mechanical properties are reported in Table II.

In these tables, AT is the annealing temperature, QT the quenching temperature, PT the partitioning temperature, Pt the partitioning time, and GAT is the alloying temperature.

TABLE II

| Example | Steel | AT °C. | QT °C. | PT °C. | Pt s | GAT °C. | YS MPa | TS MPa | UE % | TE % |
|---|---|---|---|---|---|---|---|---|---|---|
| 1 | I1 | 900 | 215 | 400 | 100 | 500 | 990 | 1479 | 16.5 | 22 |
| 2 | I1 | 900 | 215 | 400 | 200 | 500 | 950 | 1460 | 16.6 | 22.1 |
| 3 | I1 | 900 | 215 | 400 | 300 | 500 | 1070 | 1450 | 16.4 | 21.5 |
| 4 | I1 | 900 | 230 | 400 | 100 | 500 | 910 | 1460 | 18 | 23 |
| 5 | I1 | 900 | 230 | 400 | 200 | 500 | 950 | 1465 | 18.1 | 24 |
| 6 | I1 | 900 | 230 | 400 | 300 | 500 | 1000 | 1450 | 16.6 | 22 |
| 7 | C1 | 900 | 205 | 400 | 50 | 500 | 1062 | 1548 | 14.7 | 16.5 |
| 8 | C1 | 900 | 205 | 400 | 100 | 500 | 990 | 1561 | 14.3 | 16.5 |
| 9 | C1 | 900 | 205 | 400 | 150 | 500 | 998 | 1581 | 12.7 | 14.3 | cooling the galvannealed sheet down to the room temperature after galvannealing. The cooling speed to the room temperature is preferably between 3 and 20° C./s.

This heat-treatment and galvannealing allows obtaining a final structure i.e. after partitioning, galvannealing and cooling to the room temperature, consisting of martensite, with a surface fraction comprised between 50% and 70%, retained austenite and bainite.

A fraction of martensite comprised between 50% and 70% allows obtaining a tensile strength of at least 1450 MPa.

Furthermore, this treatment allows obtaining an increased C content in the retained austenite, which is of at least 0.9%, preferably of at least 1.0%, and up to 1.2%.

With this heat-treatment, it is possible to obtain sheets having a yield strength of at least 900 MPa, a tensile strength of at least 1450 MPa, a uniform elongation of at least 16% and a total elongation of at least 17%.

As examples and comparison, manufactured sheets made of steels whose compositions in weight % and critical temperatures such as Ac3 and Ms are reported in Table I.

TABLE I

| Ref steel | C % | Mn % | Si % | Cr % | Mo % | Al % | Nb % | Ac3 °C. | Ms °C. |
|---|---|---|---|---|---|---|---|---|---|
| I1 | 0.41 | 2.02 | 1.92 | 0.31 | 0.16 | 0.17 | — | 875 | 305 |
| C1 | 0.38 | 1.98 | 1.93 | 0.51 | 0.003 | 0.048 | 0.039 | 825 | 290 |

The underlined values are not according to the invention.

Several sheets were heat treated by annealing at a temperature $T_A$ for a time $t_A$ of 80 s, quenching at a temperature Examples 1-6 show that with a steel having a composition according to the invention, in particular comprising 0.17% Al, with a quenching temperature QT of 215° C. or 230° C., and a partitioning temperature PT of 400° C., a steel sheet having a high level of elongation and a good strength-ductility balance can be obtained. Indeed, the sheets of examples 1-6 all have a yield strength of at least 910 MPa, a tensile strength of at least 1450 MPa, a uniform elongation UE of at least 16.5% and a total elongation TE of at least 17%, and even 21%.

The comparison of the mechanical properties of examples 1-6 further show that the desired mechanical properties obtained are almost non sensitive to the quenching temperature QT ranging from 215° C. to 230° C. and to the partitioning time Pt when it is comprised between 100 s and 300 s. Thus, the properties obtained are very robust to variations of the quenching temperature and/or the partitioning time.

By comparison, the properties of examples 7-8, made of a steel containing 0.048% Al, are more sensitive to variations of the partitioning time Pt.

What is claimed is:

1. A galvannealed steel sheet made of a steel having a chemical composition including by weight:
0.34%≤C≤0.45%,
1.50%≤Mn≤2.30%,
1.50%≤Si≤2.40%,
0%<Cr≤0.7%,
0%≤Mo≤0.3%,
0.10%≤Al≤0.7%,
optionally 0%≤Nb≤0.05%, and a remainder, the remainder including Fe and unavoidable impurities, a structure of the steel consisting of between 50% and 70% of martensite, retained austenite, and bainite.

2. The galvannealed steel sheet according to claim 1, wherein the composition of the steel includes Al≤0.30%.

3. The galvannealed steel sheet according to claim 1, wherein the composition of the steel includes 0.15%≤Al.

4. The galvannealed steel sheet according to claim 1, wherein the composition of the steel includes 0.03%≤Nb≤0.05%.

5. The galvannealed steel sheet according to claim 1, wherein the retained austenite has a C content between 0.9% and 1.2%.

6. The galvannealed steel sheet according to claim 1, wherein the galvannealed steel sheet has a tensile strength TS of at least 1450 MPa and a total elongation TE of at least 17% as measured according to ISO standard ISO 6892-1, published in October 2009.

\* \* \* \* \*